United States Patent [19]
Boyd et al.

[11] Patent Number: 5,436,654
[45] Date of Patent: Jul. 25, 1995

[54] LENS TILT MECHANISM FOR VIDEO TELECONFERENCING UNIT

[75] Inventors: Edward L. Boyd, Montvale, N.J.; Aziel T. Suarez, San Diego, Calif.

[73] Assignee: Sony Electronics, Inc., Park Ridge, N.J.

[21] Appl. No.: 192,826

[22] Filed: Feb. 7, 1994

[51] Int. Cl.6 .............................................. H04N 7/14
[52] U.S. Cl. ......................................... 348/14; 348/15; 348/20
[58] Field of Search ........................ 379/53, 54, 202; 348/13, 14, 15, 16, 17, 18, 19, 20, 143, 373, 375, 376; 354/74; H04N 7/14

[56] References Cited

U.S. PATENT DOCUMENTS 5,077,784 12/1991 Fujita et al. ............................ 348/14

FOREIGN PATENT DOCUMENTS

0113656 4/1990 Japan ..................................... 379/53
403262288 11/1991 Japan ............................... H04N 7/14

Primary Examiner—Curtis Kuntz
Assistant Examiner—Jason Chan
Attorney, Agent, or Firm—Jay H. Maioli

[57] ABSTRACT

A video teleconferencing unit includes the lens assembly, the speaker, and the microphone in a single housing, and further includes a lens tilt mechanism wherein the lens is fixedly mounted to a bezel that is pivotally mounted on a front cover of said housing, such that rotation of the lens can be accomplished by rotating the bezel without having to move the housing.

6 Claims, 10 Drawing Sheets

LENS TILT MECHANISM FOR VIDEO TELECONFERENCING UNIT

BACKGROUND OF THE INVENTION

1. Field of the Invention

The present invention relates generally to the field of televideo communications and, more specifically, to two-way video teleconferencing equipment used in the office environment.

2. Description of the Background

A video teleconferencing unit has been proposed for use in the office environment in connection with a personal computer ("PC") to enable one party at a first location to visually and audibly communicate with a second party at a second location. The sound is detected by a microphone and transmitted and reproduced by a loud speaker. The visual image is picked up by a lens of a video camera and reproduced on the monitor of the PC.

It is becoming more desirable to use televideo communication equipment in the office environment, as it is an efficient mode of communication with innovative features such as simultaneous visual and audio transmission. The communication systems currently available, however, typically consist of several individual components, such as a camera housing, a remote microphone, and separate speakers, thereby rendering the system unduly cumbersome.

Furthermore, in current teleconferencing systems, the lens assembly is fixedly attached to the main housing of the camera and transmitting unit. Therefore, in order to adjust the angle or position of the lens, the entire main housing must be moved or propped up to achieve varying angles. Such movement is undesirable as it leads to possible damage to the teleconferencing unit from excessive movement and it decreases the adaptability of the unit.

OBJECTS AND SUMMARY OF THE INVENTION

In order to solve the above-described problems, an object of the present invention is to provide a video teleconferencing unit that combines the lens, speaker, and microphone in one unit so that the unit is compact and easily transportable.

Further, another object of the present invention is to provide a lens tilt mechanism for the video teleconferencing unit whereby the lens is pivotally mounted on the unit housing so that the lens can be manually adjusted without having to adjust the positioning of the entire teleconferencing unit.

According to one aspect of the present invention, by having the lens fixedly mounted on a bezel that is, in turn, pivotally mounted on a housing, a user can press the top or bottom of the bezel for rotation of the lens in an upward or downward direction, respectively.

The above and other objects, features, and advantages of the present invention will become apparent from the following detailed description of illustrative embodiments thereof to be read in conjunction with the accompanying drawings.

DETAILED DESCRIPTION OF PREFERRED EMBODIMENTS

Figure 1:
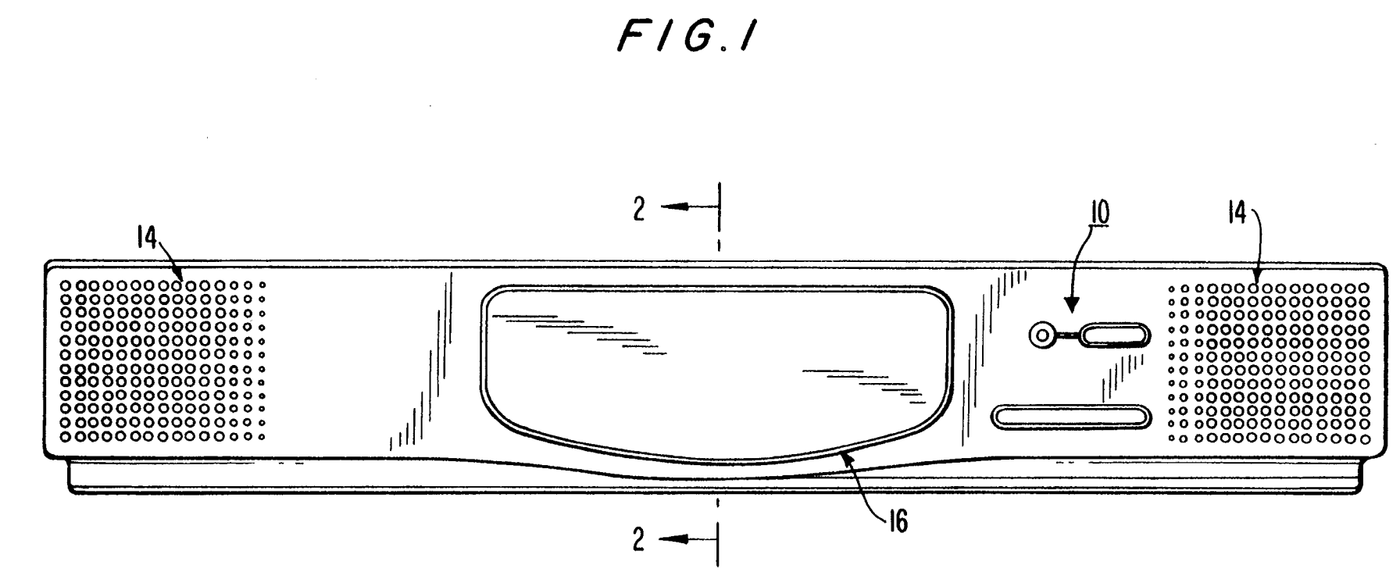
FIG. 1 is a front view of the front cover of the video teleconferencing unit according to an embodiment of the present invention.
Figure 2:
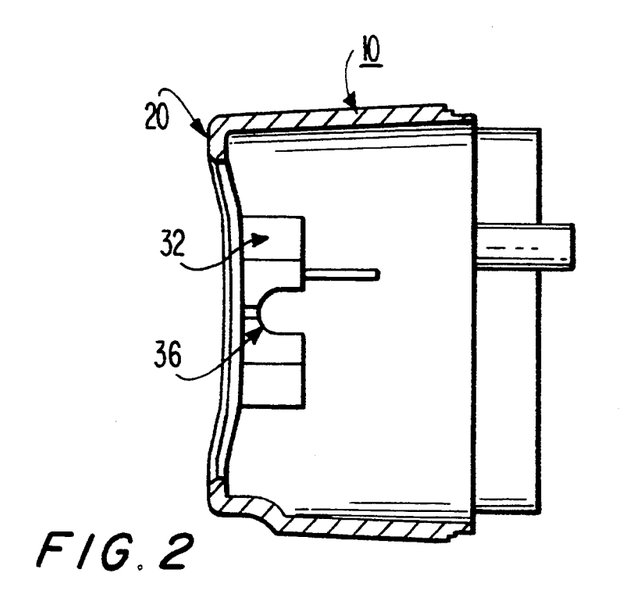
FIG. 2 is a cross-sectional side view of the front cover taken along section lines A—A in FIG. 1.
Figure 8:
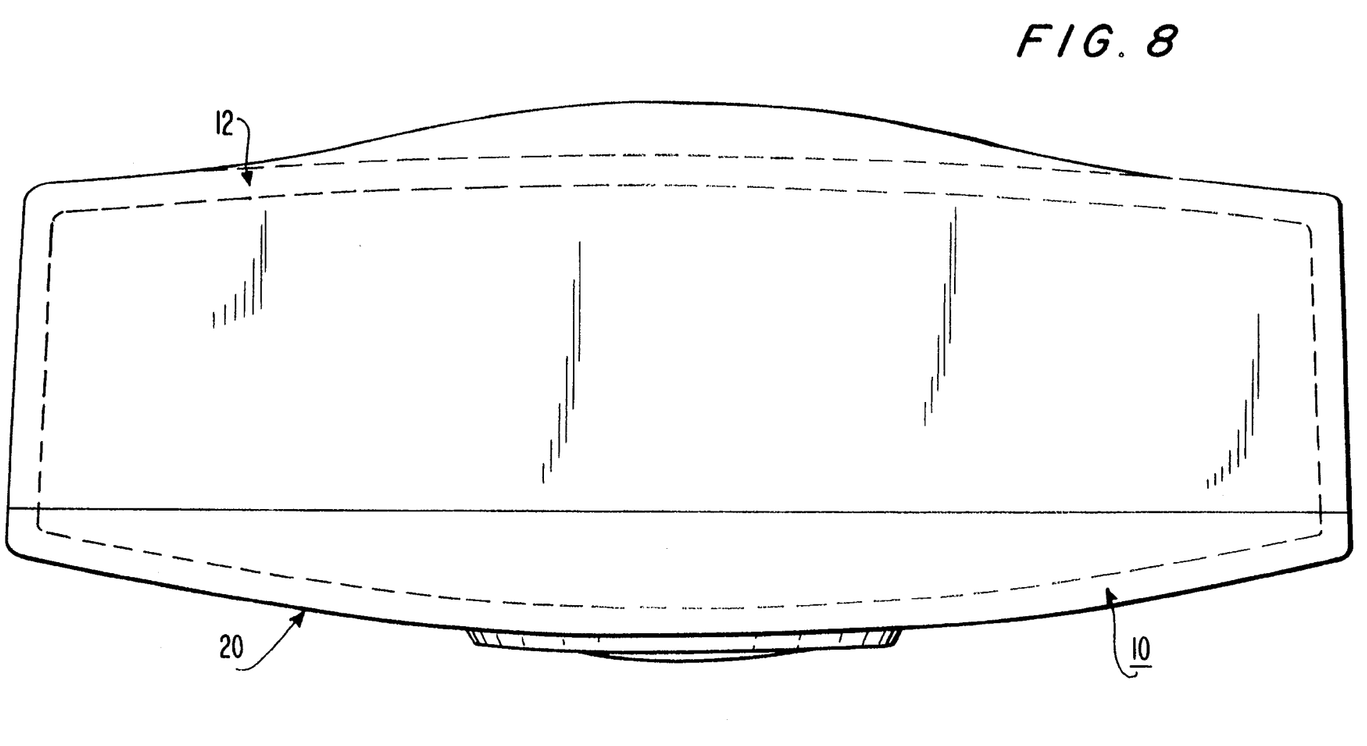
FIG. 8 is a top view of the video teleconferencing unit of FIG. 7.

The video teleconferencing unit according to the present invention has a front cover 10 attached to a housing 12 that contains the video amplifiers and the like as shown in FIG. 8. The front cover 10 is of a generally rectangular shape as shown in FIG. 1. Both the left and right portions of the front cover 10 have a plurality of through-holes or perforations 14 for transmitting and receiving sound therethrough. In the central portion of the front cover 10, an opening 16 is formed for receiving a bezel 18. The opening 16 is of a generally rectangular shape with the lower side being in the shape of an arc protruding downward. The front surface 20 of the front cover 10 bows out in the general shape of a convex arc, as shown in FIG. 8. FIG. 2 is a cross-section of the front cover 10 in a longitudinal direction along section lines 2—2 of FIG. 1 and shows that the front surface 20 is slightly indented.

Figure 3:
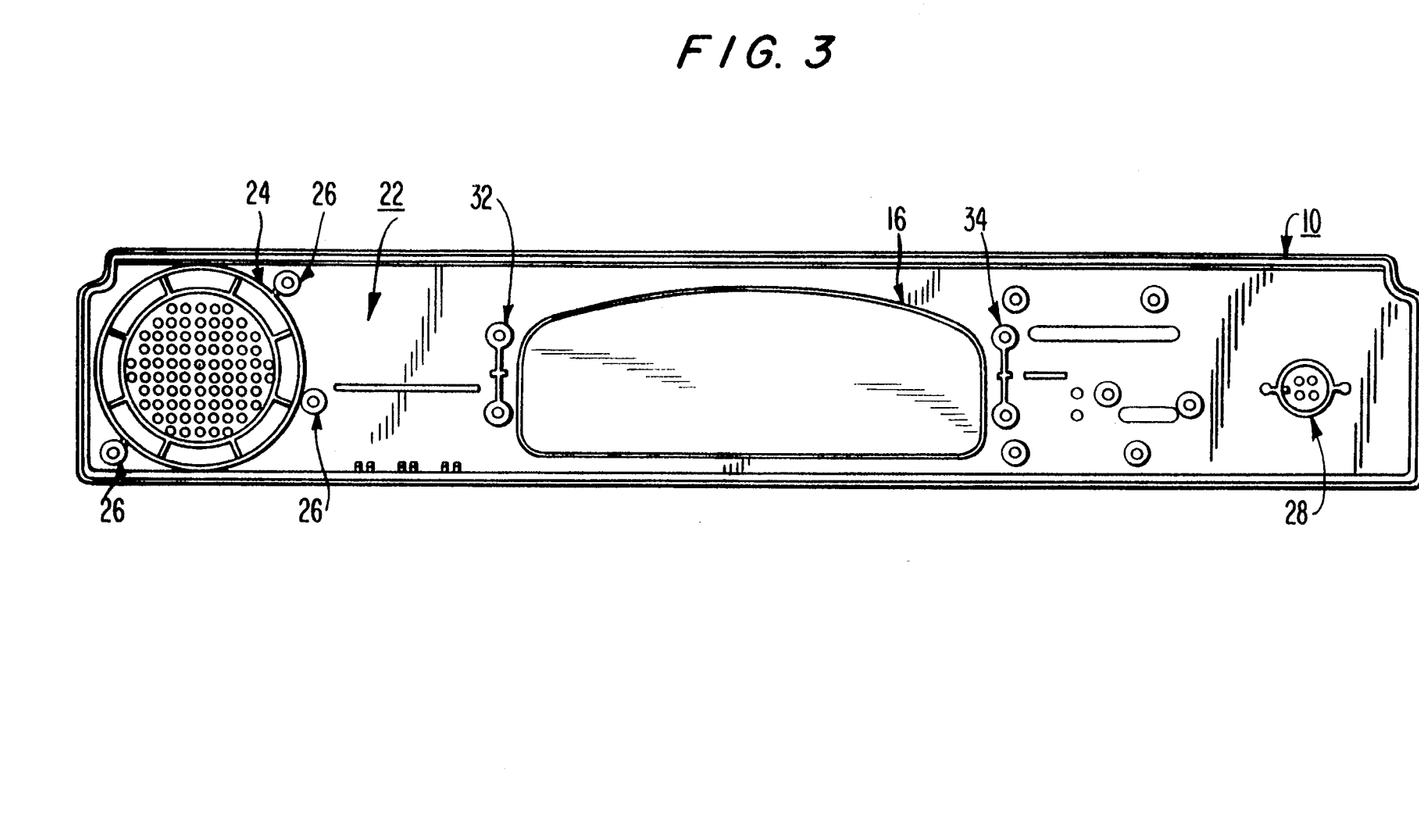
FIG. 3 is an inverted rear view of the inside surface of the front cover.

FIG. 3 shows the inner surface 22 of the front cover 10. As is shown, on the left portion of the front cover 10 a speaker 24 is mounted with screws attached to bosses 26. On the right portion of the front cover 10, a microphone 28 is mounted. The lens assembly 30 is mounted at the opening 16. Therefore, the lens assembly 30, the speaker 24, and the microphone 28 are all contained in a single housing.

As shown in FIG. 3, on the left and right sides of the opening 16, support brackets 32, 34, respectively, are mounted for supporting the bezel 18. The support brackets 32, 34 are of a generally rectangular shape with a semicircular receiving portion 36 formed at a vertically-central portion of a side thereof, as shown in FIG. 2. The semicircular receiving portion 36 faces the rear of the front cover 10. The support brackets 32, 34 are oriented so that they extend perpendicularly rearward from the inner surface 22 of the front cover 10, as shown in FIG. 2. The support brackets 32, 34 are further comprised of bosses 38, 40, 42, 44 for receiving screws (not shown) for attaching mating brackets (not shown) thereto, as will be described hereinafter.

Figure 4:
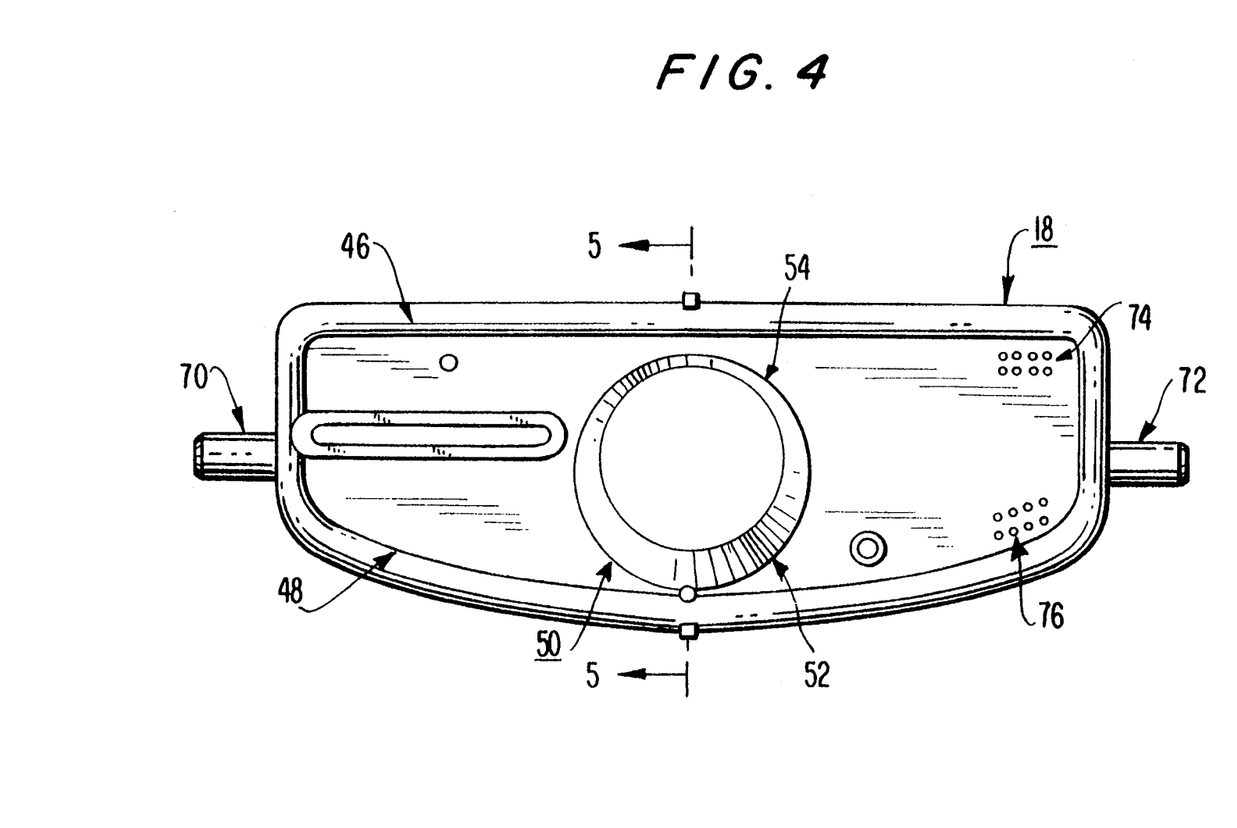
FIG. 4 is a front view of the bezel.
Figure 5:
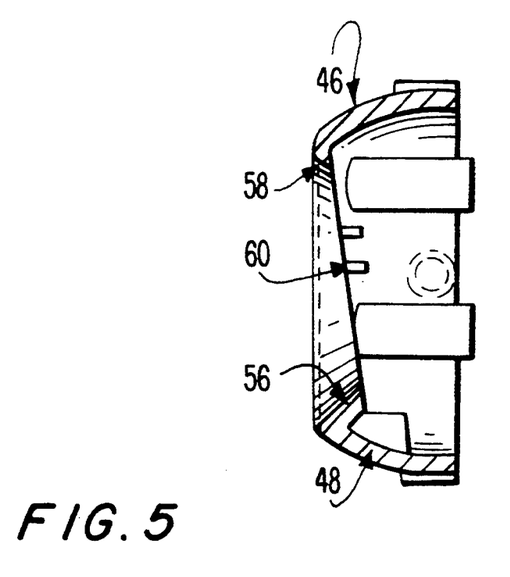
FIG. 5 is a cross-sectional side view of the bezel taken along section lines B—B in FIG. 4.
Figure 6:
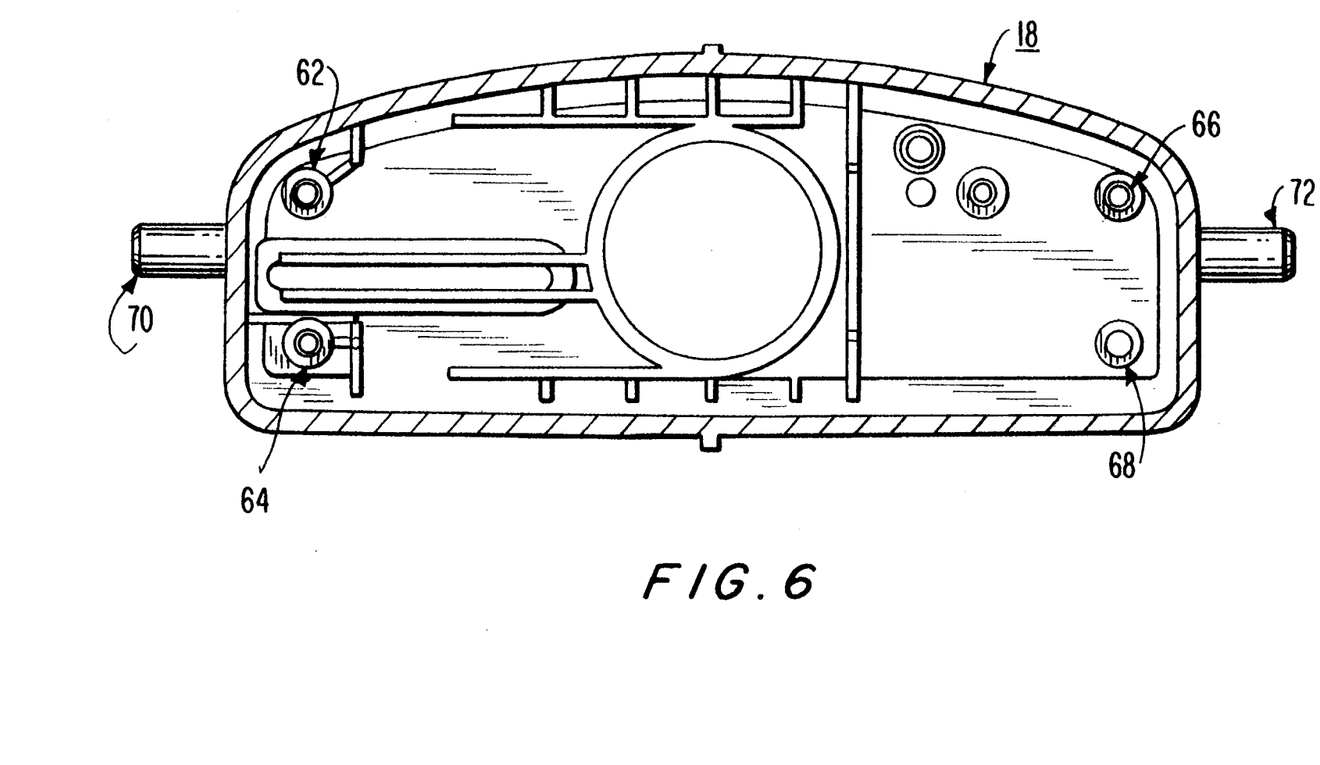
FIG. 6 is an inverted view of the rear surface of the bezel of FIG. 4.

Now, the bezel 18 fitted in the opening 16 will be described with reference to FIGS. 4 through 6. FIG. 4 is a front view of the bezel 18 having the same general shape as the opening 16. The lateral and longitudinal dimensions of the bezel 18, however, are less than the corresponding dimensions of the opening 16, so that the bezel 18 does not contact the opening 16, The upper portion 46 and the lower portion 48 of the bezel 18 are curved inward from the rear toward the front surface, as shown in FIG. 5.

The bezel 18 has an opening 50 formed at a central portion thereof for receiving the lens assembly 30. The opening 50 is formed in a generally conical shape with an opening angle of around 75°–80° along a lateral axis, having an outer diameter 52 and an inner diameter 54, which diameters are not concentric such that when the lens assembly 30 is fitted in the opening 50, it is easily positioned in a downward direction. In fact, the lower surface 56 of the opening 50, as shown in a cross-sectional view of the bezel 18 in FIG. 6, is inclined at an angle of 32.5° and the upper surface 58 is inclined at an angle of 32° relative to an axis perpendicular to the plane of an inclined surface 60, which will now be described. A planar inclined surface 60 inclined at an angle of 7.5° relative to a vertical reference plane from the upper, front portion of the bezel toward the lower, rear portion thereof if formed in the opening 50. The lens assembly 30 is mounted in an opposing relationship to this inclined surface 60 as will now be described.

The lens assembly 30 is mounted to a metal bracket (not shown). The metal bracket is then mounted to the rear surface of the bezel 18 with screws that are fitted in bosses 62, 64, 66, 68, located at each corner of the rear surface of the bezel 18. On the rear surface of the lens assembly 30, a CCD (not shown) is mounted for detecting the image received thereby. The video signal processing circuitry resides in the housing 12 but forms no part of the instant invention.

Support shafts 70, 72 are mounted on the left and right sides, respectively, of the bezel 18 at substantially central portions thereof. The support shafts 70, 72 engage the receiving portions 36 of the support brackets 32, 34 mounted on the front cover 10 for supporting the bezel 18. Once the support shafts 70, 72 have been fitted in the receiving portions 36, a mating bracket (not shown) is attached to the rear surface of the support brackets 32, 34 by screws screwed in bosses 38, 40, 42, 44 to hold the support shafts 70, 72 in place.

A plurality of bumps 74, 76 are formed on the upper right and lower right surfaces of the bezel 18 to indicate the locations at which the bezel 18 is pushed for rotation. The tolerances between the support shafts 70, 72 and the support brackets 32, 34 and mating brackets (not shown) are such that a force must be applied to rotate the bezel 18, which will cease rotating once the force is removed. The bezel is rotatable within a limited range.

Figure 7:
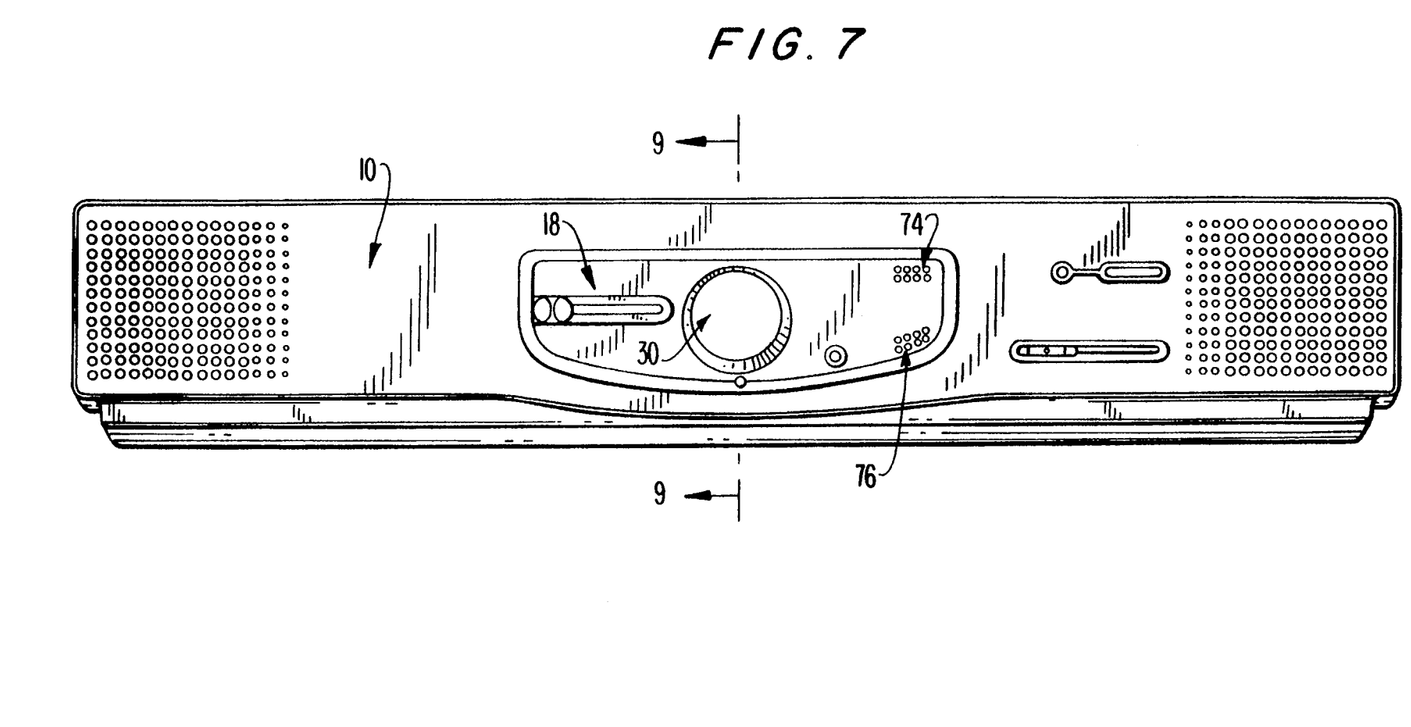
FIG. 7 is a front view of the video teleconferencing unit according to an embodiment of the present invention.

The lens tilt mechanism of the present invention will now be described with reference to FIGS. 7 through 11. FIG. 7 shows the fully-assembled video teleconferencing unit according to the present invention. In order to tilt the lens assembly 30 mounted on the bezel 18 upward, a user presses the upper right portion of the bezel 18 indicated by the bumps 74. In order to tilt the lens assembly 30 downward, the user presses the lower right portion of the bezel 18 indicated by the bumps 76.

Figure 9:
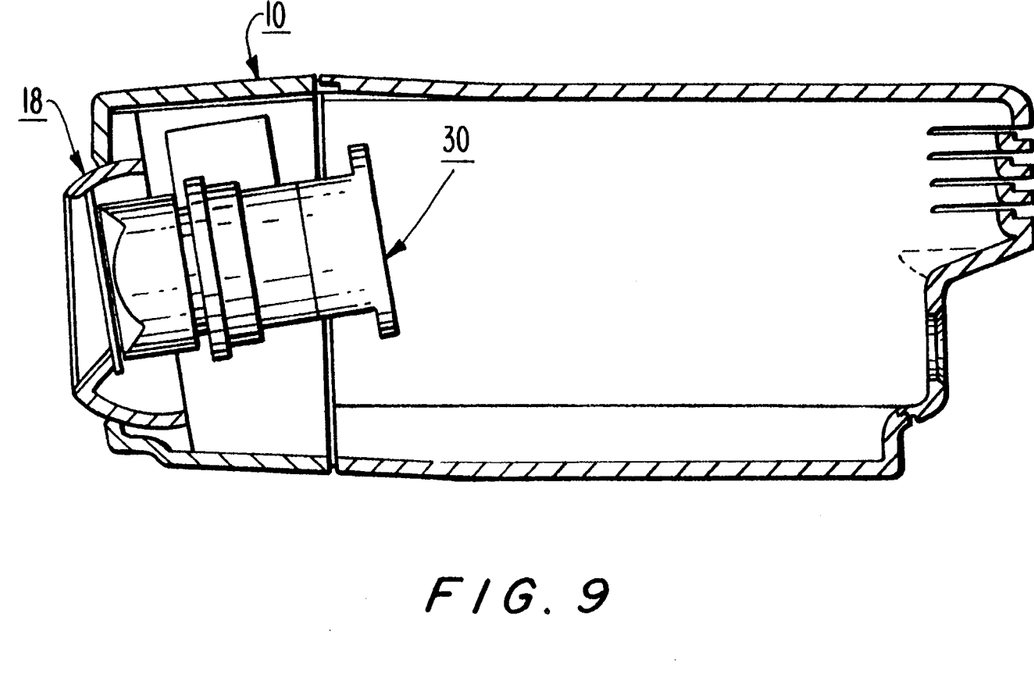
FIG. 9 is a cross-sectional view of the lens assembly in the normal position taken along section lines D—D in FIG. 7.
Figure 10:
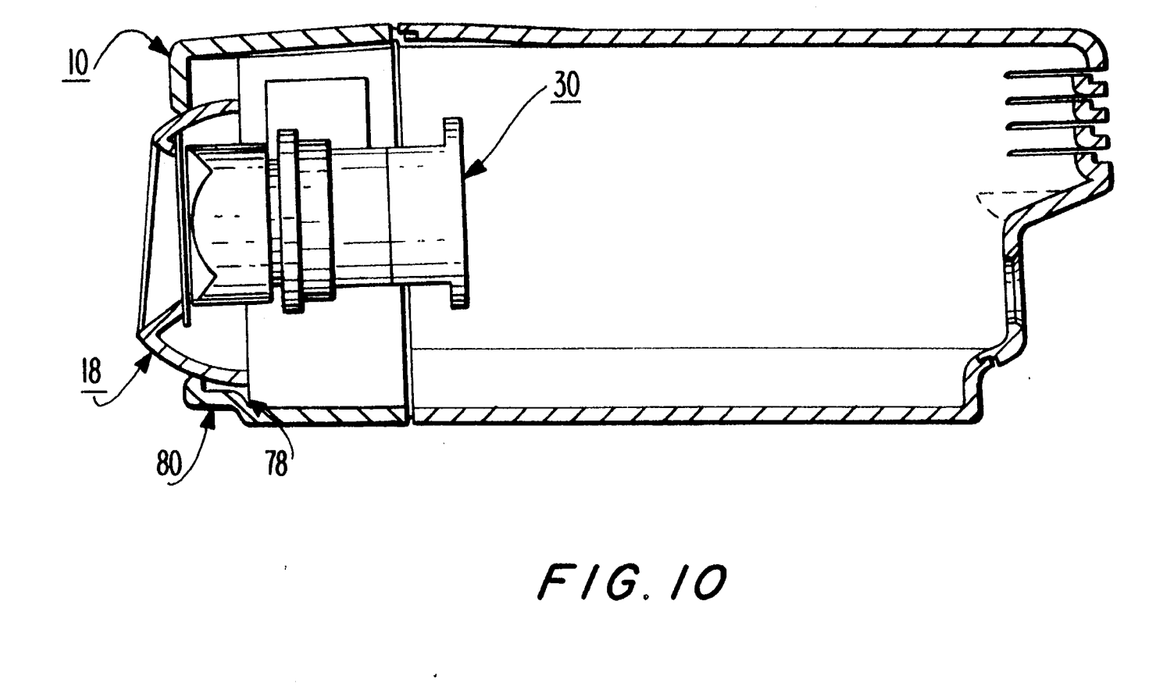
FIG. 10 is a cross-sectional side view of the lens assembly in the "UP" position taken along section lines D—D in FIG. 7.
Figure 11:
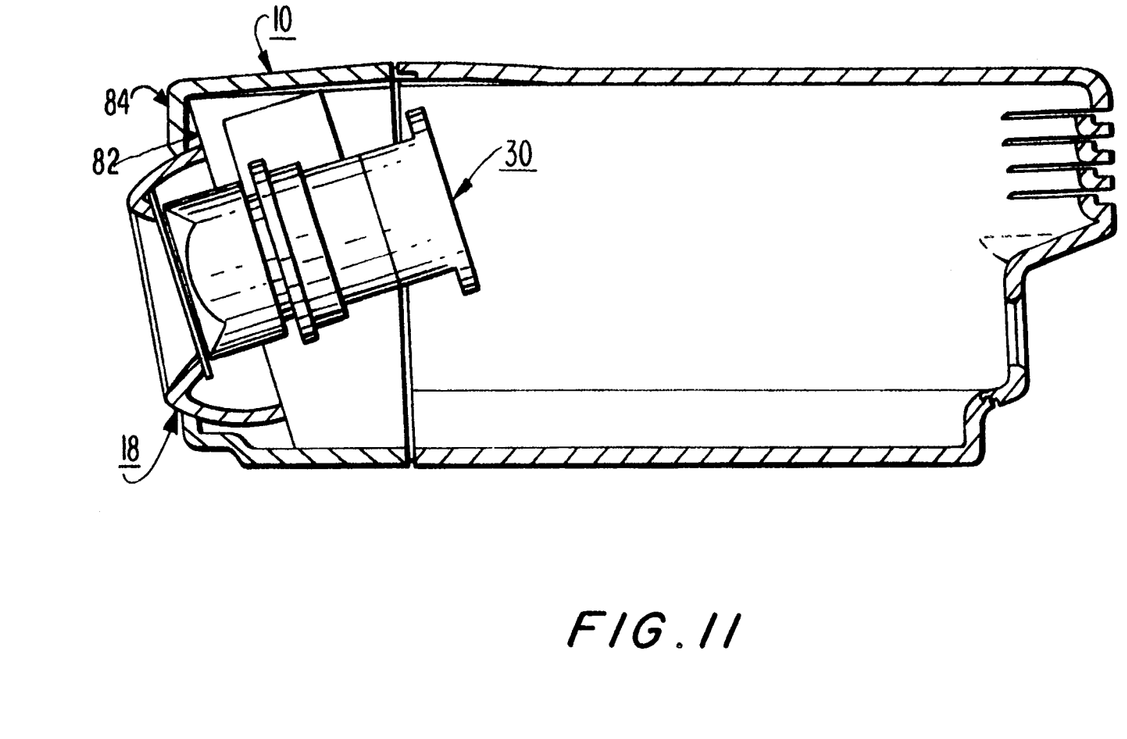
FIG. 11 is a cross-sectional side view of the lens assembly in the "DOW" position taken along section lines D—D in FIG. 7.

The lens assembly 30 is mounted on the rear surface of the bezel 18, as shown in FIGS. 9–11. In the normal position, the lens assembly 30 is at an angle of 7.5° with respect to a horizontal axis, as shown in FIG. 9. When a user presses the upper right portion of the bezel 18 indicated by the bumps 74, the bezel 18 tilts upward to an "UP" position. As force is continuously applied, the bezel 18 continues to rotate up until a lower flange 78 contacts the lower surface 80 of the front cover 10. At this extreme point in the upward range of movement, the lens assembly 30 is aligned with the horizontal axis, as shown in FIG. 10.

When a user presses the lower right portion of the bezel 18 indicated by the bumps 76, the bezel 18 tilts downward to a "DOWN" position. As force is continuously applied, the bezel 18 continues to rotate down until an upper flange 82 contacts the upper surface 84 of the front cover 10. At this extreme point in the downward range of movement, the lens assembly 30 is at an angle of 15° with respect to the horizontal axis, as shown in FIG. 11.

Thus, the range of movement of the lens assembly 30 is restricted to 15° with respect to a horizontal axis. This range corresponds to the range necessary to accommodate a user having a height ranging from the 50% percentile of small women to the 50% percentile of tall men sitting before the PC monitor.

During rotation, the upper and lower surfaces 46, 48, respectively, of the bezel 18 are never in contact with the upper and lower surfaces 84, 80, respectively, of the opening 16.

The present invention makes it possible to manually move the lens assembly 30 to target a designated subject without having to move the entire video teleconferencing unit, thereby enabling the unit to remain in a single location, such as on top of the PC monitor.

Having described specific preferred embodiments of the present invention with reference to the accompanying drawings, it is to be understood that the invention is not limited to those precise embodiments, and that various changes and modifications may be effected therein by one skilled in the art without departing from the spirit or the scope of the present invention as defined in the appended claims.

What is claimed is:

1. A video teleconferencing unit comprising:
   a housing;
   a front cover mounted on said housing;
   an opening formed in said front cover;
   a bezel pivotally mounted in said opening for rotation about a horizontal axis and including a first indicated area and a second indicated area, each for pressing by a user and rotating said bezel;
   a lens fixedly mounted on said bezel for rotation therewith;
   a first plurality of apertures formed through said front cover at one side thereof adjacent said opening;
   a second plurality of apertures formed through said front cover at another side thereof adjacent said opening;
   a speaker mounted on said front cover at said first plurality apertures; and
   a microphone mounted on said front cover at said second plurality of apertures.

2. A video teleconferencing unit as defined in claim 1, further comprising an upper flange and a lower flange mounted to said bezel wherein one of said upper flange and said lower flange contacts one of an upper surface or a lower surface of said front cover at an extreme point of rotation of said bezel.

3. A video teleconferencing unit as defined in claim 2, wherein said extreme point of rotation is 7.5° from a normal position of said bezel.

4. A video teleconferencing unit as defined in claim 1, wherein said lens in mounted on said bezel at an angle of 7.5° when said bezel is in a normal position.

5. A video teleconferencing unit as defined in claim 1, further comprising a left support shaft mounted on a left side of said bezel and a right support shaft mounted on a right side of said bezel for supporting said bezel on said front cover.

6. A video teleconferencing unit as defined in claim 5, further comprising a left receiving portion mounted on a left side of said opening and a right receiving portion mounted on a right side of said opening, wherein said left receiving portion is engageable with said left support shaft and said right receiving portion is engageable with said right support shaft, for supporting said bezel on said front cover.

* * * * *